United States Patent [19]

Esche

[11] Patent Number: 4,687,250
[45] Date of Patent: Aug. 18, 1987

[54] ADJUSTABLE SEAT ASSEMBLY FOR VEHICLE

[75] Inventor: John C. Esche, Hartford, Wis.

[73] Assignee: Milsco Manufacturing Company, Milwaukee, Wis.

[21] Appl. No.: 782,112

[22] Filed: Sep. 30, 1985

[51] Int. Cl.$^4$ .............................................. A42C 3/00
[52] U.S. Cl. .................................. 297/320; 298/399; 297/301
[58] Field of Search ............... 297/309, 320, 322, 316, 297/304, 317; 248/394, 395, 396

[56] References Cited

U.S. PATENT DOCUMENTS

| | | | |
|---|---|---|---|
| 717,026 | 12/1902 | Ostendorf | 297/320 |
| 2,009,024 | 7/1935 | Salons | 297/309 |
| 2,306,289 | 12/1942 | Viall, Sr. et al. | 297/320 X |
| 3,124,388 | 3/1964 | Berlin | 297/320 |
| 3,163,466 | 12/1969 | Radke et al. | 297/320 X |
| 3,931,995 | 1/1976 | Arai | 297/341 |
| 4,074,886 | 2/1978 | Yates | 248/394 |
| 4,222,607 | 9/1980 | Dimmock | 297/320 X |
| 4,285,487 | 8/1981 | Kazaoka et al. | 248/394 |
| 4,397,501 | 8/1983 | Meiller et al. | 297/301 |
| 4,513,937 | 4/1985 | Langmesser, Jr. | 248/396 X |
| 4,533,177 | 8/1985 | Latone | 297/301 |

FOREIGN PATENT DOCUMENTS

| | | | |
|---|---|---|---|
| 3045368 | 6/1982 | Fed. Rep. of Germany | 297/320 |
| 1124109 | 6/1956 | France | 297/320 |
| 392165 | 5/1933 | United Kingdom | 297/320 |

*Primary Examiner*—Peter A. Aschenbrenner
*Attorney, Agent, or Firm*—James E. Nilles; Thomas F. Kirby

[57] ABSTRACT

A vehicle seat assembly comprises a support frame attachable to a vehicle cab floor by a guide/slide rail assembly. A manually actuatable horizontally swingable lever mounted on the guide/slide rail assembly alongside the seat releasably locks the entire seat assembly is selected fore and aft positions. A seat and pivotally interconnected backrest are pivotally, slidably and resiliently mounted on the support frame. The seat is horizontally shiftable fore and aft on the support frame to vertically tilt the backrest. A manually actuatable vertically pivotable backrest adjustment bar is mounted on and extends horizontally along the front of the seat and releasably locks the seat on the support frame so as to maintain the backrest in selected tilt positions. A resilient suspension, which resiliently supports the seat and backrest on the support frame, includes a pair of helical tension springs having upper ends hooked to the upper rear of the support frame and lower ends connected to the ends of a flexible non-stretchable cable that passes beneath the seat. The cable bight is connected to stationary cable anchors and to an adjustably movable cable adjustment member, both mounted on the underside of the seat. A manually rotatable screw mounted on the front of the seat adjustably positions the cable adjustment member to adjust spring tension to account for differences in seat occupant weight and severity of road shock. Resilient bumpers reduce shock when the seat and backrest reach their vertical travel limits and dampers slow down vertical motion of the backrest.

14 Claims, 12 Drawing Figures

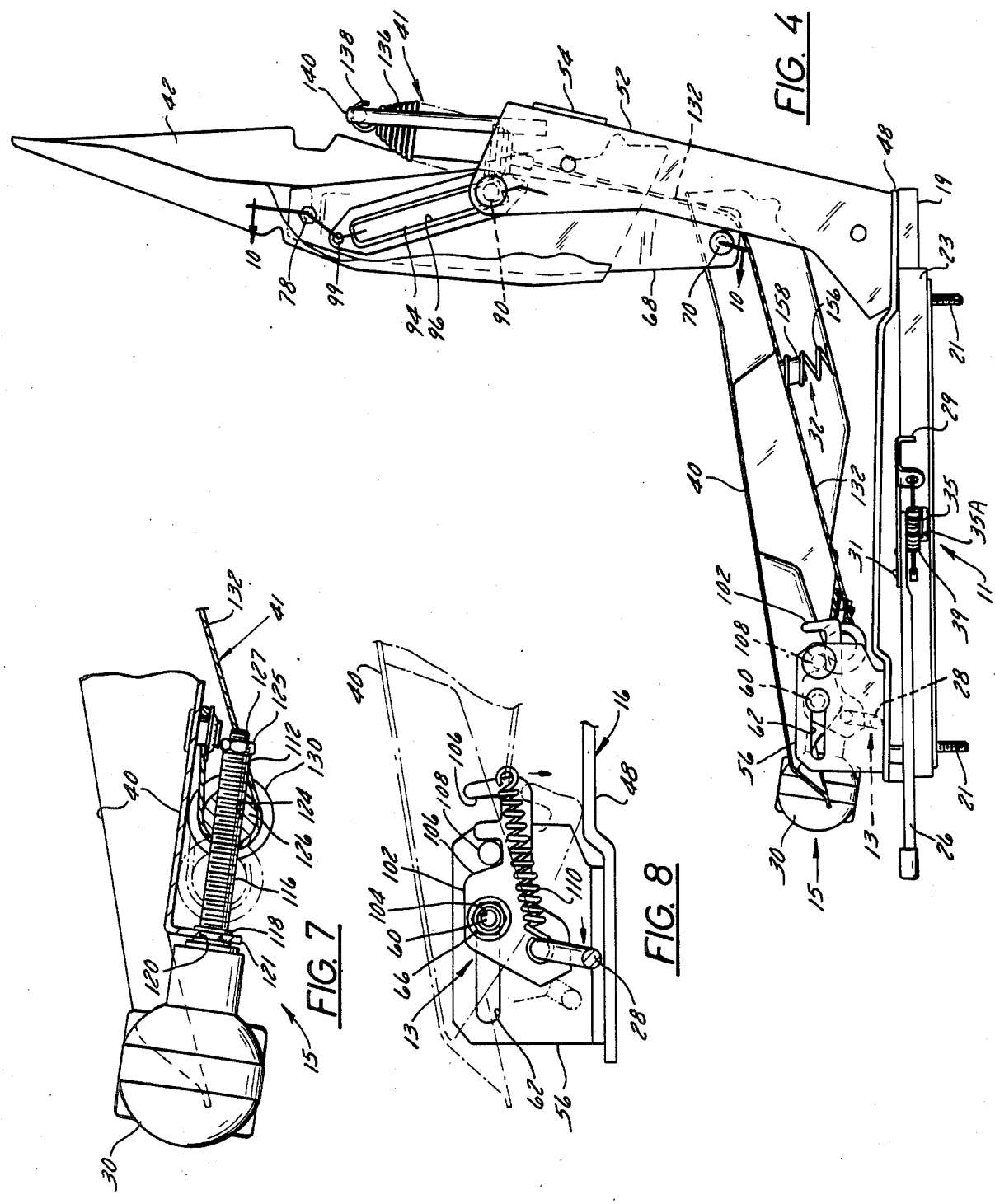

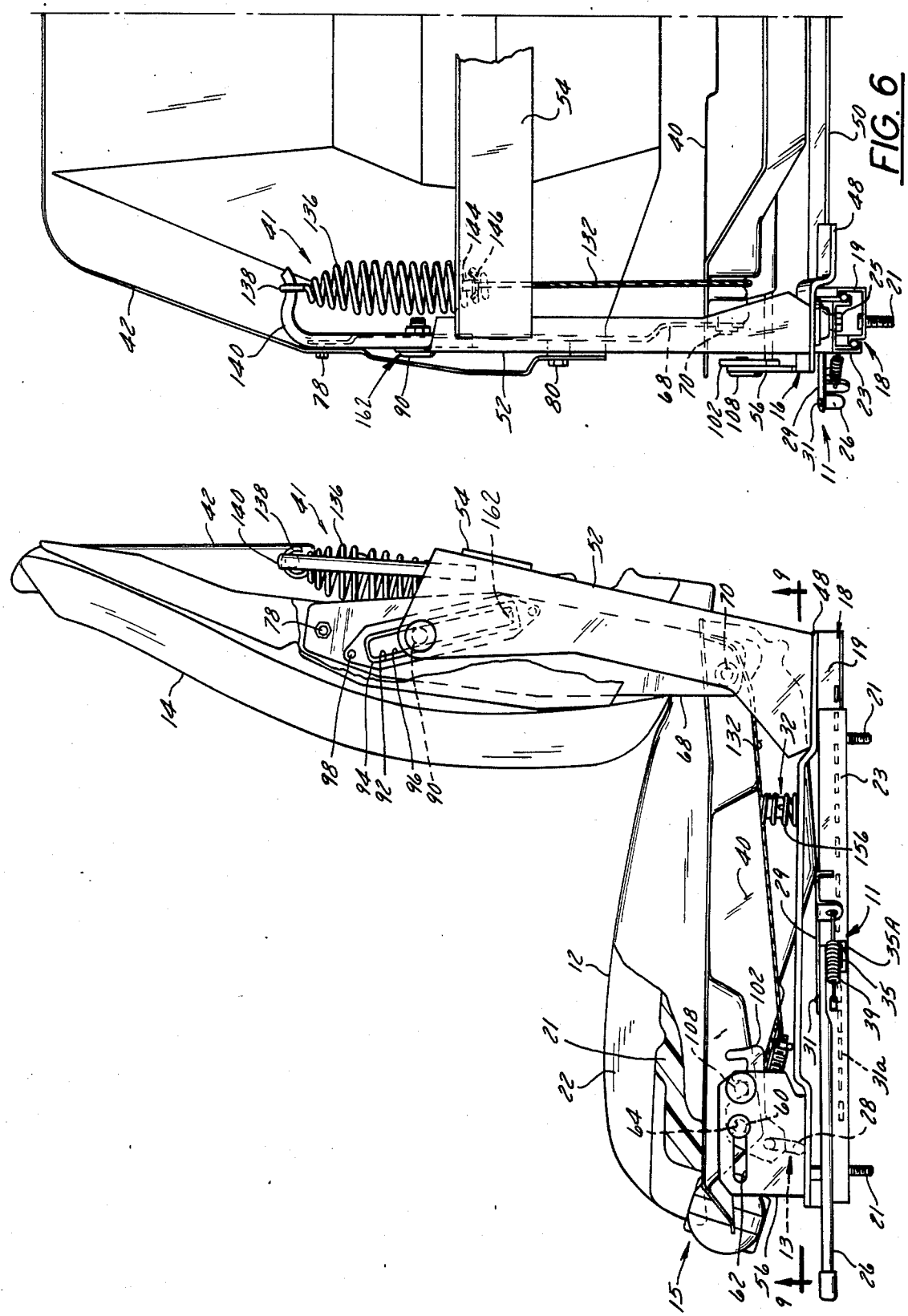

ADJUSTABLE SEAT ASSEMBLY FOR VEHICLE

BACKGROUND OF THE INVENTION

1. Field of Use

This invention relates generally to an adjustable vehicle seat assembly which comprises a seat and a backrest mounted on a support frame.

In particular, it relates to improved means for fore and aft adjustable positioning of the seat assembly on a vehicle, to improved means for adjustable tilting of the backrest, and to improved adjustable suspension means for resiliently mounting the seat and backrest on the support frame.

2. Description of the Prior Art

A wide variety of adjustable vehicle seat assemblies are known and commercially available. Such a seat assembly typically comprises a horizontal seat, an upright backrest and a support frame on which they are mounted. The adjustability features take various forms. For example, in some cases, the entire seat assembly can be rotated about a vertical axis, or raised and lowered vertically, or adjustable positioned fore and aft, or adjustably tilted. Often, a combinbtion of some or all of these adjustment features is available. In some instances, either the entire seat assembly or at least the seat thereof is provided with resilient suspension means which are adjustable to take into account vehicle operators of different weights and/or rough terrain conditions. Some seat assemblies include integral or detachable arm rests and the arm rests may be stationary or adjustably positionable. However, prior art seat assemblies incorporating some or all of the above features have become increasingly more complex in construction, hard to adjust, trouble-prone and unreliable in use and costly to manufacture.

SUMMARY OF THE INVENTION

A vehicle seat assembly comprises a support frame attachable to a vehicle cab floor by a guide/slide rail assembly which enables fore and aft adjustable positioning of the entire seat assembly. A manually actuatable horizontally swingable lever is mounted on the guide/slide rail assembly at one side of the seat and releasably locks the seat assembly in selected fore and aft positions. A seat and backrest are pivotally interconnected to each other and are pivotally, slidably and resiliently mounted on the support frame. The front end of the seat is pivotally and slidably connected to the support frame. The rear end of the seat is pivotally connected to the lower ends of slotted links which are rigidly connected to the sides of the backrest. The backrest is pivotally and slidably connected to the support frame by pins on the support frame which engage the slotted links. The seat is shiftable fore and aft on the support frame to tilt the backrest. A manually actuatable horizontally extending vertically pivotable backrest adjustment bar is mounted on the front end of the seat and releasably locks the seat so as to maintain the backrest in selected tilt positions. A resilient suspension, which resiliently supports the seat and backrest on the support frame, includes a pair of helical tension springs having upper ends hooked to the upper rear of the support frame and lower ends connected to the ends of a flexible non-stretchable cable that passes beneath the seat. The cable bight is connected to stationary cable anchors and to an adjustably movable cable adjustment member, both mounted on the underside of the seat. A manually rotatable screw is mounted on the front end of the seat and adjustably positions the cable adjustment member to adjust spring tension to account for the operator's weight and road shock. Resilient bumpers reduce shock when the seat and backrest reach their vertical travel limits. Dampers on the pins which engage the links operate to slow down vertical travel of the backrest.

A seat assembly in accordance with the invention offers several advantages over the prior art. For example, all adjustment controls are located near the front of the seat assembly in order to accommodate narrow vehicle cabs and for ease of access to the seat occupant. The adjustment controls are operated with simple hand movements such as horizontally swinging a lever to enable fore and aft seat assembly positioning, lifting an adjustment bar to enable backrest tilt adjustment, or turning a spherical knob on a screw to adjust spring tension and weight settings. The seat assembly is capable of accepting various types of optional equipment such as permanent or detachable arm rests (swingable or fixed position type), seat belts, an adjustable pneumatic lumbar support for the backrest, and occupant-actuated electric safety switches connected to the vehicle electrical system. The bumpers are optional for cost-reduction purposes. Other objects and advantages of the invention will hereinafter appear.

DRAWINGS

FIG. 4 is an enlarged side elevation view of the seat assembly with the upholstery, rear cover, skirt and arm rests removed and showing the seat in maximum raised position and the backrest in tilt position;

FIG. 5 is a view similar to FIG. 4 but including the upholstery on the seat and backrest (rear cover still removed) and showing the seat in partially lowered position;

FIG. 6 is a rear elevation view of a portion of the seat assembly shown in FIG. 5 but with the rear cover removed;

FIG. 7 is an enlarged side elevation view, partly in cross section, of the suspension adjustment means taken on line 7—7 of FIG. 9;

FIG. 8 is an enlarged inner side elevation view of the tilt adjustment mechanism taken generally along line 8—8 of FIG. 9;

DESCRIPTION OF A PREFERRED EMBODIMENT

General Arrangement

Figure 1:
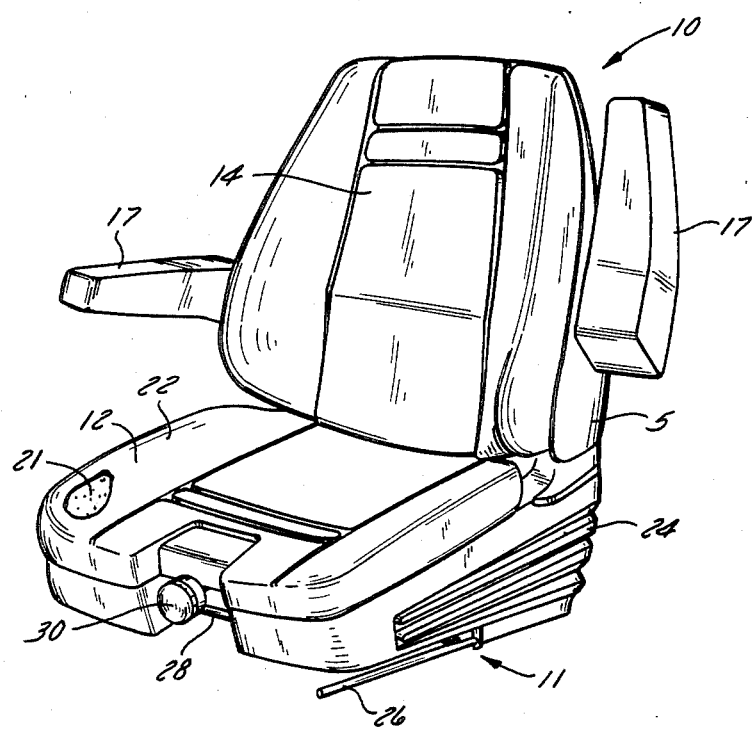
FIG. 1 is a perspective view of a seat assembly in accordance with the present invention, including a seat, a backrest and arm rests taken from the upper front left side thereof.
Figure 2:
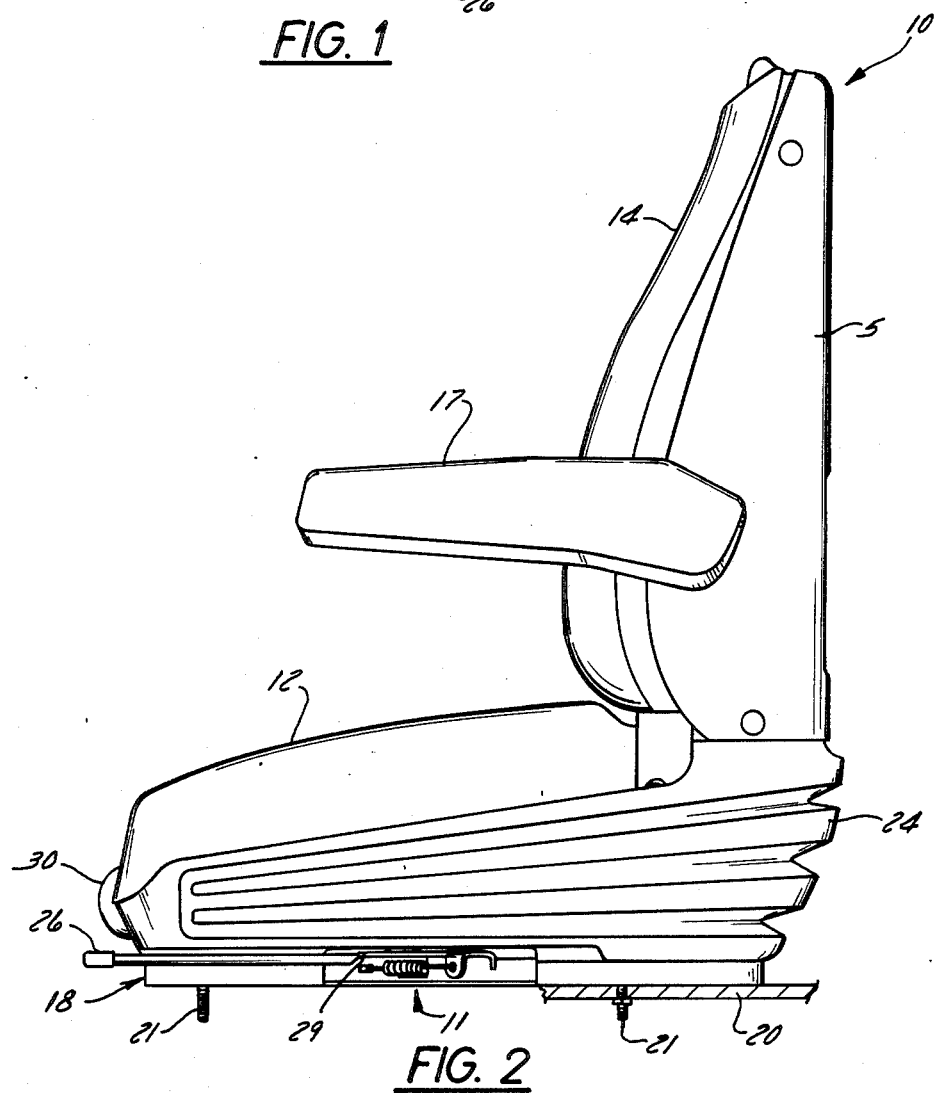
FIG. 2 is an enlarged side elevation view of the seat assembly of FIG. 1.
Figure 3:
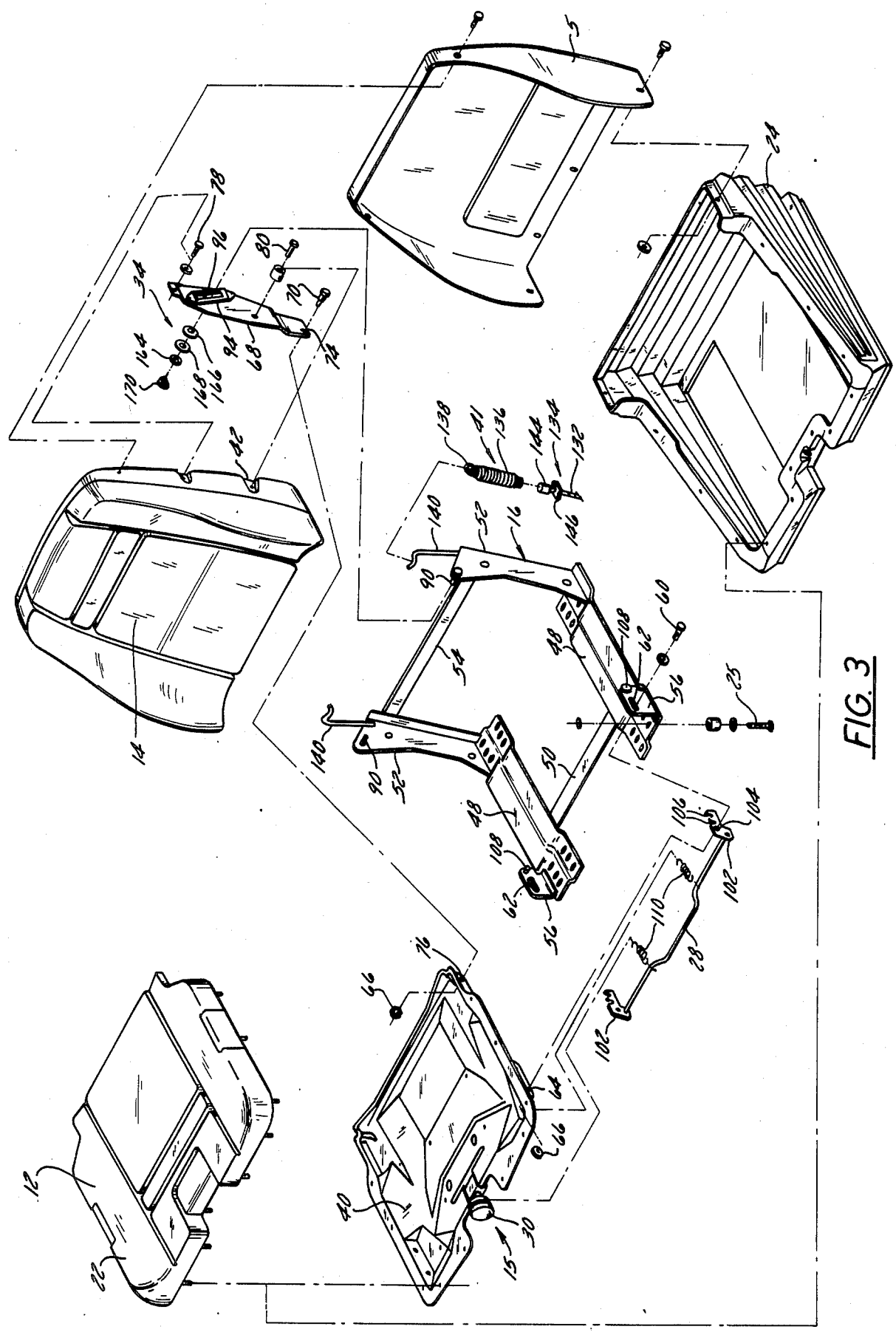
FIG. 3 is an exploded perspective view of the seat assembly, with the arm rests removed, taken from the upper front left side and showing the components thereof, including a support frame for the seat and backrest.

Referring to FIGS. 1, 2 and 3, a seat assembly 10 in accordance with the present invention generally comprises a rigid support frame 16 (FIG. 3), a horizontal seat 12, including a sheet metal seat pan 40, and a vertical backrest 14, including a sheet metal backrest pan 42.

The entire seat assembly 10 is adapted for mounting on the cab floor 20 (FIG. 2) of a vehicle (not shown) and is adapted for sliding movement relative to the floor to selected fore and aft positions wherein it can be releasably latched. The means for slidably mounting seat assembly 10 on cab floor 20 includes a guide/slide mechanism 18 attached to the bottom of support frame 16 (FIG. 6). The means for releasably latching seat assembly 10 in a selected fore and aft position includes a position adjustment mechanism 11 (FIGS. 1, 2, 4, 5 and 6) comprising a manually actuatable horizontally swingable lever 26 which is pivotally mounted on a slide rail 23 of mechanism 18 which is attached to support frame 16. Lever 26 is located beneath one side of seat 12 and operates a latch plate 29 which engages a guide rail 19 of mechanism 18.

Backrest 14 is mounted on support frame 16 and is adapted for pivotal and vertical sliding movement relative thereto to selected tilt positions (three disclosed) wherein it can be releasably latched. Backrest 14 tilts in response to fore and aft shifting movement of seat 12 which is also mounted on support frame 16. Means are provided for mounting backrest 14 on support frame 16 so that it can pivot to tilt positions and so that it can also move up and down relative to support frame 16. Such means include a pair of slotted backrest links 68 (FIGS. 3, 4, 5, 6, 10, 11, 12) which are rigidly secured to opposite sides of backrest pan 42 by upper and lower capscrews 78 and 80, respectively. The links 68 have slots 92 therein which receive backrest pivot/slide pins 90 which are mounted on opposite sides of the rear of support frame 16.

Seat 12 is mounted on support frame 16 and interconnected with backrest 14. Seat 12 is adapted for pivotal and horizontal sliding movement by the seat occupant relative to support frame 16 to selective horizontal positions (three disclosed) to effect corresponding tilting movement of backrest 14. Means are provided for mounting seat 12 on support frame 16 so that it can pivot and shift horizontally relative to support frame 16. Such means include a pair of seat pan brackets 56 which are rigidly secured to opposite sides of the front of support frame 16. Each seat pan bracket 56 comprises a horizontal slot 62 which receives a seat pivot/slide pin 60, in the form of a shoulder bolt, which extends through a hole 64 in a side of seat pan 40 near the front end thereof. Pin 60 is secured by a fastener 66.

Means are also provided for pivotally interconnecting seat 12 to backrest 14 and such means include a pair of pivot pins 70, in the form of shoulder bolts, which are mounted in holes 76 in the sides of seat pan 40 near the rear end thereof. The pivot pins 70 are also pivotally mounted in holes 74 in the lower ends of the aforementioned links 68 on the sides of backrest pan 42. Each pin 70 is secured by a threaded fastener 66.

The means for releasably latching backrest 14 in a selected tilt position includes a tilt adjustment mechanism 13 comprising a manually actuatable vertically pivotable horizontally extending tilt adjustment bar 28 which is pivotally mounted on the front of seat pan 40 by the aforesaid seat pivot/slide pins 60 (FIGS. 3 and 8). Tilt adjustment bar 28 is provided at its opposite ends with rigidly connected til latch plates 102. Each latch plate 102 has a hole 104 therethrough for accommodating one of the aforementioned pivot/slide pins 60. Each plate 102 has a plurality (two) of notches 106 along one edge which are releasably engageable with a tilt latch pin 108 which is mounted on a corresponding aforementioned seat pan bracket 56 on support frame 16. Thus, latching seat 12 in a certain horizontal position also latches backrest 14 in a corresponding tilt position.

The seat 12 and interconnected backrest 14 are resiliently supported on support frame 16 by suspension means 41 (FIGS. 3, 4, 5, 6, 7, 9) so that the rear end of seat 12 and backrest 14 can resiliently move up or down in response to shocks imposed by rough terrain traversed by the vehicle (not shown). Suspension adjustment means 15 are provided to adjust for differences in seat occupant weight and/or shock severity. The suspension means 41 includes a pair of helical tension springs 136 and a flexible non-stretchable cable 132. The upper ends of springs 136 are attached to the upper rear of support frame 16 and the lower ends of the springs are attached to the ends of cable 132. The cable bight passes beneath, engages and supports seat pan 40. The cable bight is reeved around a pair of spaced apart cable anchors 150 (FIG. 9) which are rigidly secured to the underside of seat pan 40 near the front end thereof. Downward force on seat 12 causes cable 132 to stretch the springs 136 and increase spring tension.

The suspension adjustment means 15 includes the following components, namely: a cable adjustment member 126 (FIGS. 7 and 9) located beneath the front end of seat pan 40, rollers 130 on the ends of cable adjustment member 126 and around which the cable bight is reeved, and a threaded member or screw 112 rotatably mounted on the front of seat pan 40 and in threaded engagement with a threaded hole 124 in cable adjustment member 126. Manual rotation of screw 112 by means of a spherical knob 30 rigidly secured on the outer end thereof moves cable adjustment member 126 toward or away from the anchors 150 and thereby decreases or increases the force on cable 132 and correspondingly relaxes or stretches the springs 136 to adjust spring tension.

Resilient bumper assemblies 32 (FIGS. 4, 5 and 9) between seat pan 40 and support frame 16 and bumpers 162 (FIGS. 10, 11 and 12) on the aforesaid links 68 reduce shock and lessen operator fatigue when seat 12 and backrest 14 reach their limits of vertical travel. Damper assemblies 34 (FIGS. 3 and 10) on the pivot/slide pins 90 and engageable with the links 68 operate to slow down vertical travel of backrest 14.

Specific details of the aforedescribed components will now be described.

Upholstery

As FIG. 5 shows, seat 12 and backrest 14 comprise the rigid stamped sheet metal pans 40 and 42, respectively, which are upholstered with resilient cushioning material 21 having a flexible covering 22, such as vinyl, thereover (FIG. 5). As FIGS. 1, 2 and 3 show, backrest pan 42 has a rigid cover 5 (metal or plastic) attached to its rear side. A flexible accordian-pleated plastic protective skirt 24 attached to the edges of seat pan 40 and to the lower edge of cover 5 surrounds the lower part of support frame 16 and portions of the associated mechanisms for purposes of operator safety, mechanism cleanliness and aesthetic appearance. Backrest 14 is provided with a pair of detachable, upholstered, optional arm rests 17 (FIGS. 1 and 2) which are vertically swingable between in-use and raised positions.

Rail Assembly

As FIGS. 1, 2, 4, 5 and 6 show, guide/slide rail assembly 18 comprises the pair of laterally spaced apart rigid guide rails 19 for stationary attachment by bolts 21 to vehicle cab floor 20. Assembly 18 further comprises the pair of rigid slide rails 23 which are slidably interengaged with and movable with respect to the guide rails 19. The slide rails 23 are attached by bolts 25 to the underside of support frame 16. The rails 19 and 23 have generally C-shaped flanged cross-sectional configurations which open upwardly and downwardly, respectively, to facilitate sliding interengagement.

Fore and Aft Position Adjustment Mechanism

As FIGS. 5 and 6 show, the swingable lever 26 of position adjustment mechanism 11 is rigidly secured by a rivet 31 to a latch plate 29 which, in turn, is pivotally connected to left slide rail 23 of rail assembly 18. Latch plate 29 has a projection 35 which extends through a slot 35A in slide rail 23 and is releasably engageable or latchable with any one of a plurality of depressions 31a in the side of the associated guide rail 19 which is attachable to vehicle cab floor 20. Lever 26 is biased into latched position (shown in FIGS. 5 and 6) by a helical tension spring 39 connected between plate 2 and slide rail 23. Lever 26 is manually swingable outwardly to unlatched position wherein seat assembly 10 can be shifted by the seat occupant to selected fore or aft positions relative to the guide rails 19 (and thus to the vehicle cab floor).

Support Frame

As FIG. 3 best shows, support frame 16 is a rigid metal weldment comprising two laterally spaced apart horizontal lower side members 48 which are joined together near their front ends by a welded-in-place front brace 50. Support frame 16 also comprises two laterally spaced apart vertical upright side members 52 which are joined together near their upper ends by a welded-in-place rear brace 54. The lower ends of the upright side members 52 are welded to the rear ends of their respective lower side members 48. Each lower side member 48 has one of the aforedescribed seat pan brackets 56 welded to its front end.

Links

Referring to FIGS. 3, 10, 11 and 12, each backrest link 68 is mounted for pivotal and vertical sliding movement on support frame 16 by means of the pivot/slide pin 90 which is rigidly attached to and extends axially inwardly from the upper end of an upright 52 and through a relatively large elongated hole or slot 92 pierced in link 68. To reduce metal-to-metal motion-inhibiting friction and wear between upright 52, link 68 and pivot/slide pin 90, an anti-friction slile plate 94 formed of Teflon (TM) or acetal plastic or the like and having a slot 96 therein (which generally corresponds in size, shape and registration to slot 92 in link 68) is provided. Plastic plate 94 is mounted on link 68 by means of a pair of rivets 98 which extend through a pair of rivet holes 99 in plate 94 and a pair or registering rivet holes 100 in the link 68.

Tilt Adjustment Mechanism

As previously explained, and as FIG. 8 makes clear, seat pan 40 is shiftable horizontally between any one of three fore and aft positions relative to support frame 16 by the seat occupant to effect corresponding placement of backrest pan 42 in any one of three tilt positions when backrest adjustment bar 28 is moved from latched to unlatched position. Bar 28 releasably locks seat pan 40 in a chosen fore and aft position (and backrest pan 42 in chosen tilt position). Bar 28 extends horizontally and has tilt latch plates 102 rigidly secured to the opposite ends thereof. Each tilt latch plate 102 has a pair of open-ended notches 106 for releasable engagement with a tilt latch pin 108 on a corresponding bracket 56. The rear edge of each bracket 102 is also engageable with the pin 108 to define a third position. When bar 28 is manually swung or pivoted upwardly by the seat occupant, each pin 108 is disengaged from both associated slots 106. When bar 28 is swung or pivoted downwardly, one or the other of slots 106 or the rear edge of bracket 102 (depending on the location of seat pan 40) receives and engages its associated pin 108 to latch backrest 42 in one of three selected tilt positions. A pair of helical tension springs 110, each connected between bar 28 and seat pan 40, bias bar 28 in latched position.

Suspension Means

As FIGS. 5, 6, 7 and 9 show, cable 132 of suspension means 41, which is preferably formed of woven metal strands, has spring fastener assemblies 134 at its opposite ends by which the cable ends can be secured to the pair of suspension springs 136. Each suspension spring 136 takes the form of a helical tension spring having a hook 138 at its upper end by means of which it is secured to one of a pair of upwardly extending spring support brackets 140 which are rigidly secured by welding to the upper ends of the uprights 52 of support frame 16. The lower end of each suspension spring 136 is connected to the spring fastener assembly 134 at one end of cable 132. Each fastener assembly 134 comprises a stop lug 144 which is swaged or welded to an end of cable 132 and a clip 146 which is slidably mounted on the cable and engages the lower end of a spring 136 by rotatable insertion between a pair of adjacent spring coils. When so engaged, tension on cable 132 is transfered from a lug 144 to its associated clip 146 and from thence to the associated spring 136 which then extends axially and exerts a pulling force on the cable.

Figure 9:
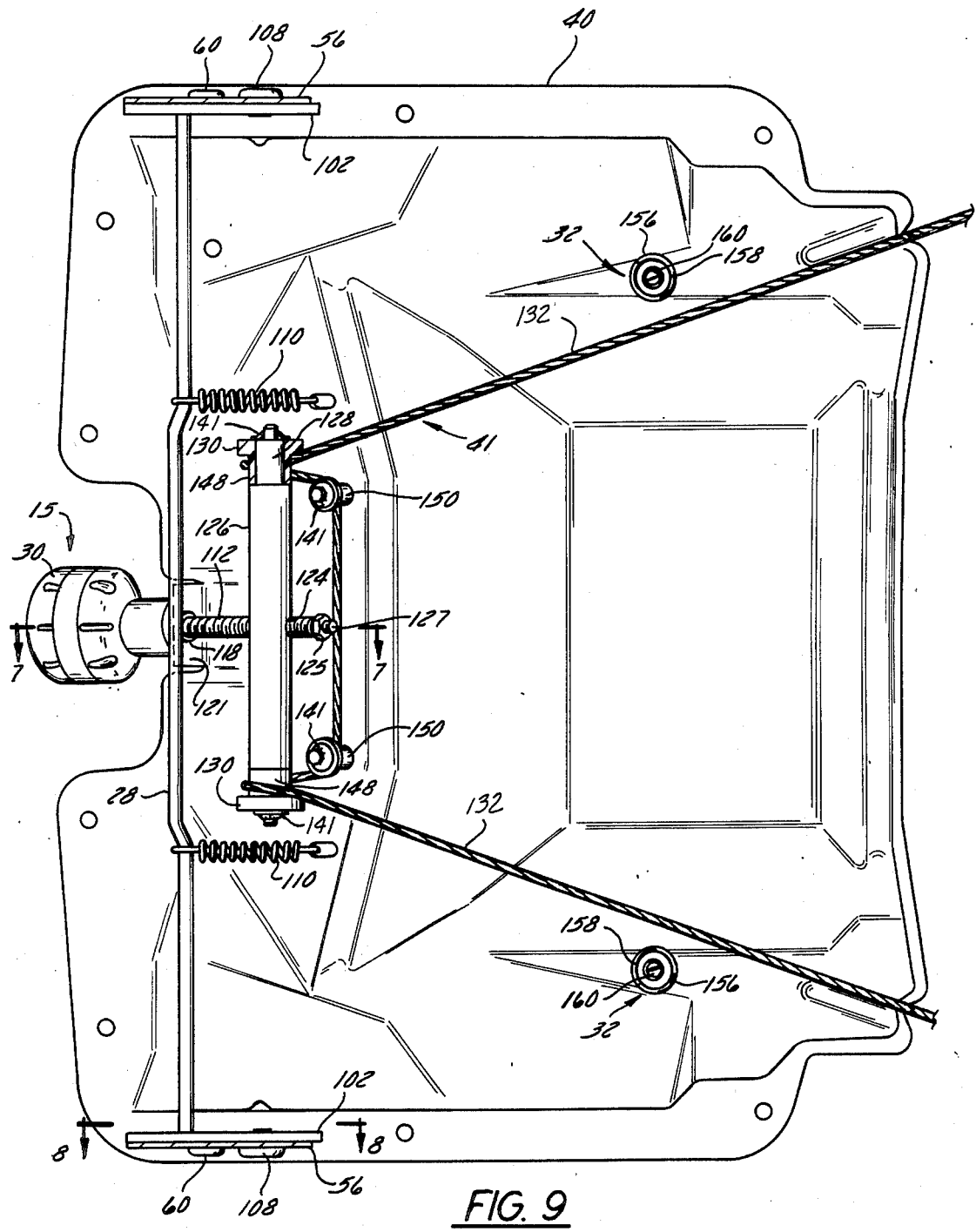
FIG. 9 is a bottom plan view of the underside of the seat and showing portions of the suspension means and its adjustment means taken along line 9—9 of FIG. 5.

As FIG. 9 shows, cable 132 extends beneath and supporting engages the underside of seat pan 40, is reeved around small diameter portions 148 of the aforementioned rollers 130, and the bight of the cable is hooked around the pair of laterally spaced apart cable anchors 150 located on the underside of seat pan 40 adjacent the rear side of shaft 126. The anchors 150 take the form of larged-headed pins welded to seat pan 40. Push nuts 141 or similar fasteners are installed onto cable anchors 150 to prevent the cable from slipping off the ends thereof.

Suspension Adjustment Means

As FIGS. 7 and 9 show, suspension means 41, which resiliently supports seat pan 40 and backrest pan 42 attached thereto, is adjustable by rotation of screw 112. Knob 30 is rigidly secured to the outer (forward) end of screw 112 which has a threaded inner end portion 116. Screw 112 is rotatably mounted in a Nylon (TM) or similar material bushing or bearing 118 which is disposed in a hole 120 in a downwardly depending flange 121 on the front edge of seat pan 40. Threaded portion 116 threadedly engages threaded bore 124 which extends transversely through cable adjustment member or shaft 126 which is located beneath and transversely disposed with respect to seat pan 40. A nut 125 is engaged with a small threaded projection 127 on the inner end of screw 112. Nut 125 limits travel of shaft 126 along screw 112 as the screw is rotated. Shaft 126 has axles 128 at its opposite ends on which a pair of Nylon (TM), or Acetal, or the like rollers 130 are rotatably mounted, being retained thereon by fasteners 141 such as push nuts. The rollers 130 engage and ride on the underside of seat pan 40 as shaft 126 is adjustably moved fore and aft by manual rotation of screw 112. The cable 132 is wrapped around the rollers 130.

Bumper Assemblies

As FIGS. 4, 5 and 9 show, the laterally spaced apart resilient bumper assemblies 32 are mounted on the underside of seat pan 40 near the rear end thereof. The bumper assemblies 32 engage the lower side members 48 of support frame 16 when seat pan 40 reaches its extreme maximum downward travel and absorb the shock of the hard abrupt stop at the end of the suspension motion. Each bumper assembly 32 comprises a "soft" compression spring 156 and an annular rubber bumper 158 mounted on pan 40 by a screw fastener 160. In the event of a large shock or bump, the "soft" spring 156 absorbs some of the energy while the rubber bumper 158 absorbs the remaining input.

Figure 10:
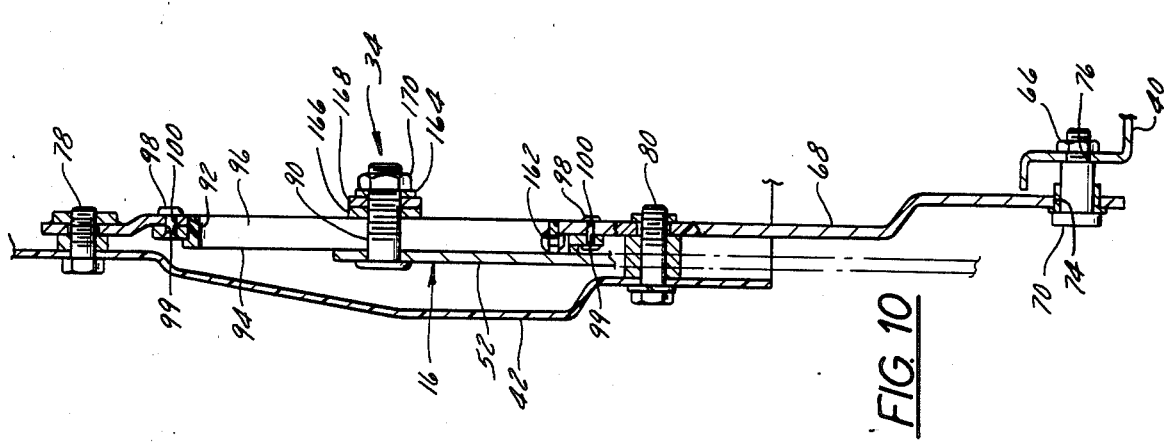
FIG. 10 is an enlarged cross section view of a slotted link for connecting the backrest to the support frame taken on line 10—10 of FIG. 4.
Figure 11:
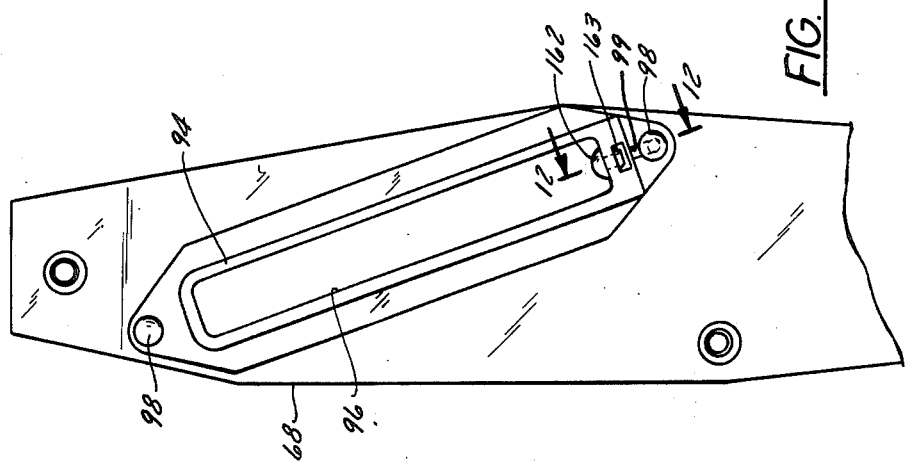
FIG. 11 is a side elevation view of the link shown in FIG. 10.
Figure 12:
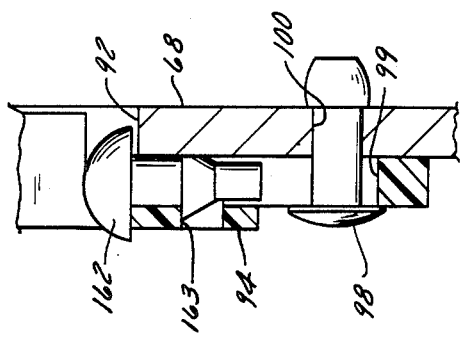
FIG. 12 is an enlarged view of a resilient bumper on the link taken on line 12—12 of FIG. 11.

As FIGS. 10, 11 and 12 show, a pair of resilient bumpers 162 are mounted on the links 68. Each bumper 162 resembles a rivet which snaps into a hole 163 at the bottom of slot 96 in plastic slide plate 94 on link 68. When pin 90 travels to the bottom of slot 96, it makes direct contact with resilient bumper 162. This reduces the sudden stop when seat pan 40 and backrest pan 42 move to full up position as the suspension means 41 returns to undeflected position.

The bumper assemblies 32 and bumpers 162 are intended to reduce operator fatigue by minimizing the jarring shock, experienced by the operator, when the main spring suspension system is "bottomed out" or "topped out".

Damper Assemblies

As FIGS. 3 and 10 show, a pair of damper assemblies 34 are mounted on the pivot/slide pins 90 and are engageable with the the links 68. The damper assemblies 34 operate to slow down upward or downward vertical travel of backrest 14 relative to frame 16. Each damper assembly 34 comprises a friction washer 166, fabricated of brake-shoe liner material, for example, which is mounted on an associated pin 90 and rides on or slides along the inner surface of metal link 68. Friction washer 166 is held in place by a curved spring washer 164, a flat steel washer 168 and a shoulder nut 170, which are also mounted on pin 90. Nut 170 screws onto the threaded end of pin 90 and is rotatably adjustable to load or unload spring washer 168 and thereby adjust the amount of drag exerted by friction washer 166 on link 68.

I claim:

1. A seat assembly (10) for mounting on a vehicle comprising:

a support frame (16) having a fore end and an after end;

a set (12) having front and rear ends and lateral sides and movable fore and aft and pivotally relative to said support frame;

a backrest (14) having upper and lower ends and movable vertically and pivotally relative to aid support frame;

means (56, 62, 60) for pivotally and slidably connecting said seat (12) near the front end thereof to said support frame (16) near the fore end thereof to enable said seat (12) to be moved fore and aft and to pivot upwardly and downwardly relative to said support frame (16);

means (68,92,90) for pivotally and slidably connecting said backrest (14) intermediately of the upper and lower ends thereof to said support frame (16) near the aft end thereof to enable said backrest (14) to be moved upwardly and downwardly and to tilt fore and aft relative to said support frame (16);

means (68, 70, 76) for pivotally connecting said seat (12) near the rear end thereof to said backrest (14) near the lower end thereof so that fore and after movement of said seat (12) effected by an occupant of said seat (12) effects tiltiing movement of said backrest (14);

latching means (13) operable by said occupant for releasably latching said seat (12) to prevent fore and aft movement of said seat (12) and to prevent tilting movement of said backrest (14), said latching means (13) comprising:

first tilt latch means including pin means (108) mounted on said support frame (16), a mannually movable tilt adjustment member (28) mounted at the front end of said seat (12), second tilt latch means (102) including at least one slot (106) movably mounted on said support frame (16) and connected to said tilt adjustment member (28), said tilt adjustment member (28) being manually movable by said occupant between latched and unlatched positions wherein it effects corresponding movement of said second tilt latch means (102) so that said slot (106) moves into and out of latched engagement, respectively, with said pin means (108) of said first tilt latch means, and biasing means (110) connected between said tilt adjustment member (28) and said seat (12) to bias said tilt adjustment member (28) and said second tilt latch means (102) in a latched position;

suspension means (41) for resiliently supporting said seat (12) and said backrest (14) to control downward pivotal seat movement and downward vertical backrest movement which occurs in response to said occupant's weight and road shock said suspension means (41) comprising: a cable (132), means including deflectable suspension spring means (136) connecting said cable (132) to the aft end of said support frame (16), and cable anchoring means (126) mounted on said seat (12) near the front end thereof, said cable (132) being connected to said cable anchoring means (126) and selectively movable relative to said seat (12) to move said cable (132) and thereby adjust the deflection of said suspension spring means (136); and means (15) operable by said occupant for adjusting the deflection of said supension spring means (136) to accommodate said occupant's weight and road shock and comprising a mannually movable member (112, 30) movably mounted on the front end of said seat (12) for manual movement by said occupant and operatively connected to effect adjusting movement of said cable anchoring means (126).

2. A seat assembly (10) according to claim 20 wherein said tilt adjustment member (28) is pivotally movable manually upwardly and downwardly by said occupant and is mounted at and extends horizontally along the front end of said seat (12).

3. A seat assembly (10) according to claim 2 wherein said first tilt latch means (108) comprises pin means (108) disposed genereally parallel to said tilt adjustment member (28) and wherein said second tilt latch means (102) comprises a member (102) movable in a vertical plane as said tilt adjustment member (28) is pivotally moved vertically by said occupant and having a plurality of slots (106) therein defining tilt positions which receive said pin means (108).

4. A seat assembly (10) according to claim 20 wherein , in said means (15) for adjusting the deflection of said suspension spring means (136), said manually movable member comprises a rotatable threaded member (112) mounted on said seat (12) which is threadedly engaged with said cable anchoring means (126) (126) for effecting adjusting movement of said cable anchoring means (126).

5. A seat assembly (10) according to claim 2 or 3 or 4 or 1 including means (18) for connecting said support frame (16) for fore and aft movement relative to said vehicle by said seat occupant, and latching means (11) operable by said seat occupant for releasably latching said support frame (16) in a selected fore and aft position relative to said vehicle.

6. A seat assembly (10) according to claim 5 wherein said means (18) for connecting aid support frame (16) to said vehicle comprises slide rail means (23) rigidly secured to said support frame (16) and guide rail means (19) for attachment to said vehicle and slidably connected to said slide rail means (23); and wherein said latching means (11) for releasably latching said support frame (16) comprises a lever (26) mounted on said slide rail means (23) for pivotal movement horizontally between latched and unlatched positions and a latch member (29) movable by said lever (26) into and out of engagement with detent means (312) on said guide rail means (19).

7. A seat assembly (10) for mounting on a vehicle comprising:
   a support frame (16) having a fore end an after end;
   a seat (12) having front and rear ends and lateral sides and movable pivotally relative to said support frame;
   a backrest (14) having upper and lower ends and movable vertically relative to said support frame;
   maeans (56, 62, 60) for pivotally connecting said seat (12) near the front end thereof to said support frame (15) near the fore end thereof to enable said seat (12) to pivot upwardly and downwardly relative to said support frame (16);
   means (68, 92, 90) for slidably connecting said backrest (14) intermediately of the upper and lower ends thereof to said support frame (16) near the aft end thereof to enable said backrest (14) to be moved upwardly and downwardly relative to said support frame (16);
   means (68, 70, 76) for pivotally connecting said seat (12) near the rear end thereof to said backrest (14) near the lower end thereof so that pivotal movement of said seat (12) effects vertical movement of said backrest (14);
   suspension means (41) for resiliently supporting said seat (12) and said backrest (14) to control downward pivotal seat movement and downward vertical backrest movement which occurs in response to the weight of a seat occupant and to road shock, said suspension means (41) comprising: a cable (132), means including deflectable suspension spring means (136) connecting said cable (132) to the aft end of said support frame (16), and cable anchoring means (126) mounted on said seat (12) near the front end thereof, said cable (132) being connected to said cable anchoring means (126) and supportingly engaging said seat (12) and said backrest (14).

8. A seat assembly according to claim 7 wherein said cable anchoring means (126) is adjustably movable relative to said seat (12) by said seat occupant to move said cable (132) and thereby adjust the deflection of said suspension spring means (136) to accommodate said seat occupant's weight and road shock;
   and means (15) operable by said seat occupant for adjusting the deflection of said supension spring means (136) and comprising a manually movable member (112, 30) movably mounted on said seat (12) for manual movement by said seat occupant and operatively connected to effect adjusting movement of said cable anchoring means (126).

9. A seat assembly (10) according to claim 8 wherein said manually movable member (112) comprises a rotatable threaded member (112) which threadedly engages said adjustably movable cable anchoring means (126).

10. A seat assembly (10) for mounting on a vehicle comprising:
    a support frame (16) having a fore end and an aft end;
    a seat (12) having front and rear ends and lateral sides and movable fore and aft and pivotally relative to said support frame;
    a backrest (14) having upper and lower ends and movable vertically and pivotally relative to said support frame;
    means (56, 62, 60) for pivotally and slidably connecting said seat (12) near the front end therof to said support frame (16) near the fore end thereof to enable said seat (12) to be moved fore and aft and to pivot upwardly and downwardly relative to said support frame (16);
    means (68, 92, 90) for pivotally and slidably connecting said backrest (14) intermediately of the upper and lower ends thereof to said support frame (16) near the aft end thereof to enable said backrest (14) to be moved upwardly and downwardly and to tilt fore and aft relative to said support frame (16);
    means (68, 70, 76) for pivotally connecting said seat (12) near the rear end thereof to said backrest (14) near the lower end thereof so that fore and aft movement of said seat (12) effected by an occupant of said seat (12) effects tilting movement of said backrest (14);
    resilient suspension means (41) connected between said support frame (16) and said seat (12) and said backrest (14) for resiliently supporting said seat (12) and said backrest (14) to control downward pivotal seat movement and downward vertical backrest movement which occurs in response to the weight of a seat occupant and to road shock; and latching means (13) operable by said occupant for releasably latching said seat (12) to prevent fore and aft movement of said seat (12) and to prevent tilting movement of said backrest (14), said latching means (13) comprising:

first tilt latch means including pin means (108) mounted on said support frame (16), a manually movable tilt adjustment member (28) mounted at the front end of said seat (12), second tilt latch means (102) including at least one slot (106) movably mounted on said support frame (16) and connected to said tilt adjustment member (28), said tilt adjustment member (28) being manually movable by said occupant between latched and unlatched positions wherein it effects corresponding movement of said second tilt latch means (102) so that said slot (106) moves into and out of latched engagement, respectively, with said pin means (108) of said first tilt latch means, and biasing means (110) connected between said tilt adjustment member (28) and said seat (12) to bias said tilt adjustment member (28) and said second tilt latch means (102) in latched position.

11. A seat assembly (10) according to claim 10 wherein, in said latching means (13) for releasably latching said seat (12) relative to said support frame (16), said tilt adjustment member (28) is pivotally mounted at and extends horizontally along the front end of said seat (12).

12. A seat assembly (10) according to claim 11 wherein said first latch means (108) comprises pin means (108) disposed generally parallel to said tilt adjustment member (28) and wherein said second latch means (102) comprises a member (102) movable in a vertical plane as said tilt adjustment member (28) is pivotably moved and having a plurality of slots (106) therein defining tilt positions which receive said pin means (108).

13. A seat assembly (10) according to claim 10 wherein said means (68, 92, 90) for pivotally and slidably connecting said backrest (14) to said support frame (16) comprises at least one link (68) mounted on said backrest (14) and having a generally vertical slot (92) therein which is closad at both ends, and a pivot pin (90) mounted on said support frame (16) and slidably engaged in said slot (92).

14. A seat assembly (10) according to claim 13 wherein said means (68, 70, 76) for pivctally connectlng the rear end of said seat (12) to the lower end of said backrest (14) comprises a pivot pin (70) which is pivotally engaged (76) with said seat (12) and with said link (68).

* * * * *

UNITED STATES PATENT AND TRADEMARK OFFICE
CERTIFICATE OF CORRECTION

PATENT NO.   :   4,687,250
DATED        :   August 18, 1987
INVENTOR(S)  :   John C. Esche It is certified that error appears in the above-identified patent and that said Letters Patent is hereby corrected as shown below:

Column 9, line 5, claim 20 should read -- claim 1 --;

Column 9, line 19, claim 20 should read -- claim 1 --.

Signed and Sealed this

Twelfth Day of March, 1991

*Attest:*

HARRY F. MANBECK, JR.

*Attesting Officer*     *Commissioner of Patents and Trademarks*